United States Patent [19]

Virnot

[11] 4,179,739
[45] Dec. 18, 1979

[54] MEMORY CONTROLLED PROCESS FOR RAILRAOD TRAFFIC MANAGEMENT

[76] Inventor: Alain D. Virnot, 146 24th St., Del Mar, Calif. 92014

[21] Appl. No.: 877,050

[22] Filed: Feb. 13, 1978

[51] Int. Cl.² ............................................. G06F 15/48
[52] U.S. Cl. ..................................... 364/436; 246/3; 246/182 R; 364/426
[58] Field of Search ...................... 364/436, 426, 450; 24/3, 4, 5, 182 R, 187 R, 187 A

[56] References Cited

U.S. PATENT DOCUMENTS

| | | | |
|---|---|---|---|
| 3,953,714 | 4/1976 | Gabillard | 364/436 |
| 3,971,018 | 7/1976 | Isbister et al. | 364/436 |
| 3,976,272 | 8/1976 | Murray et al. | 364/436 |
| 4,023,753 | 5/1977 | Dobler | 364/436 |
| 4,066,877 | 1/1978 | Virnot et al. | 364/426 |
| 4,084,241 | 4/1978 | Tsumura | 364/450 |

*Primary Examiner*—Charles E. Atkinson
*Attorney, Agent, or Firm*—Henri J. A. Charmasson

[57] ABSTRACT

A method for regulating vehicular traffic over a network of itineraries travelled by various vehicles such as railroad trains, or other public modes of transportation. On board, computer assisted vehicle control processes are advantageously combined with traditional timetable scheduling and modern centralized traffic control concepts. Simplified audio radio communications alleviate the need for intensive track equipment. Monitoring and signaling devices are limited to those dictated by safety rules and regulations. In order to limit to a minimum the exchange of data between each vehicle and the traffic control, a set of predetermined timetables are stored on board each vehicle. Traffic instructions are reduced to two elements, the identification of the assigned timetable and a time lag constant to be uniformly added to the time entries of the assigned time-table. The method relies on precise dead-reckoning equipment on board each vehicle which permits its operation in precise conformance with the assigned time-table. The dead-reckoning equipment which allows a continuous display of the exact location of the vehicle along its prescribed itinerary uses a combination of various conventional and novel techniques for the computation of the distance travelled. The most important of these techniques comprises the recognition along the itinerary of various planned and unplanned events which have been detected during previous experimental runs and recorded in coordination with their locations. Various cross-check and probabilistic choices are used in order to achieve a very high degree of accuracy and reliability of measurement. The method also contemplates the automatic control of the vehicle speed in function of prerecorded acceleration data, and of feedback information proportional to the time error computed in function of the assigned time-table and the dead-reckoning system display.

10 Claims, 18 Drawing Figures

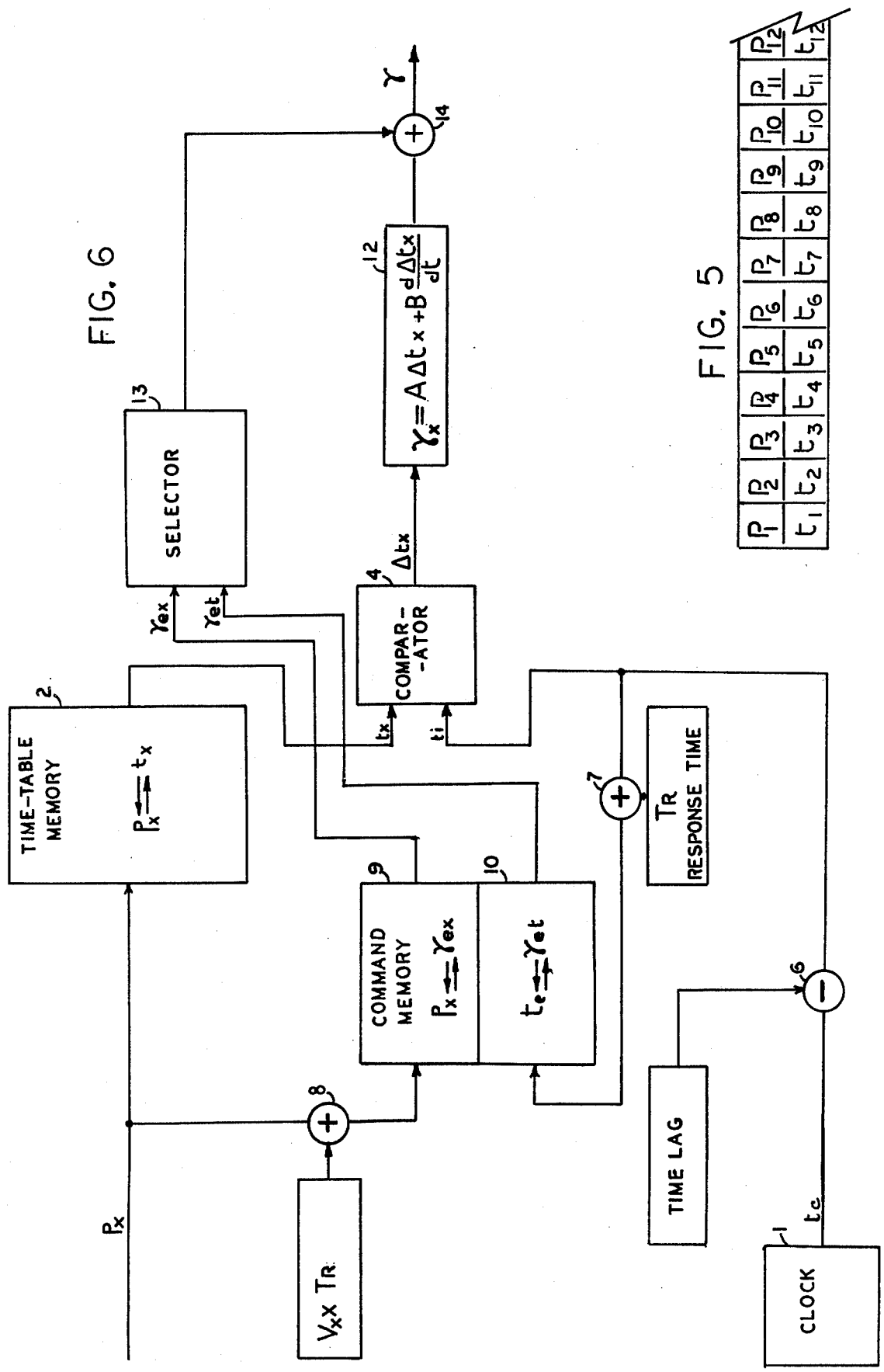

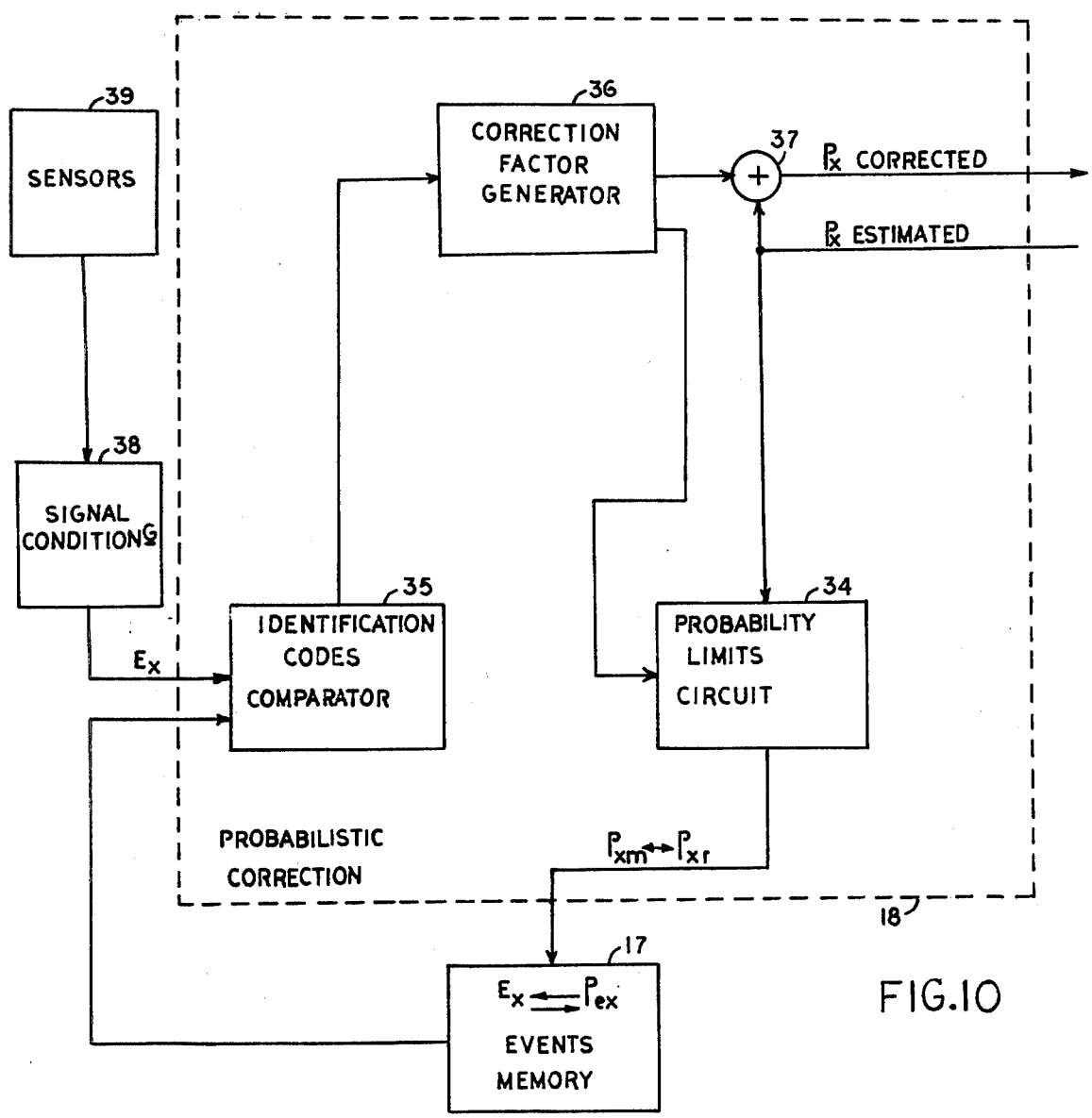
FIG.10
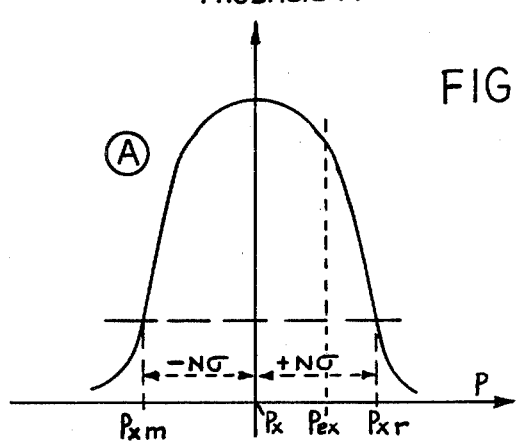
FIG 11
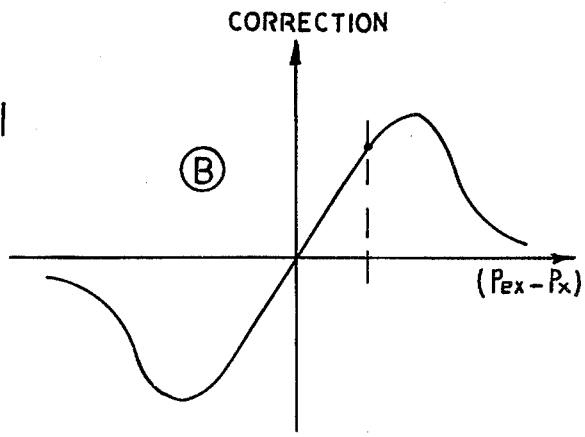

MEMORY CONTROLLED PROCESS FOR RAILRAOD TRAFFIC MANAGEMENT

BACKGROUND OF THE INVENTION

Railroad traffic management systems commonly in use today are based on the so called centralized traffic control (C.T.C.) concept, adopted in the U.S.A. in 1927. The most advanced adaptation of the C.T.C. concept is the ORE/LORENTZ/BBC system now being implemented throughout Europe. This method provides for close monitoring of each vehicle progress along its itinerary from a control center and regulation of its movement by communication of control instructions through signals and other equipment installed along the track. An itinerary for each vehicle is broadly defined in advance. Electronic data processing machines are then used to coordinate the various itineraries and to define signaling and switching instructions. The method relies upon powerful monitoring and decision making apparatuses at the traffic control center, and upon extensive detection, signaling and communication hardward installed along the tracks and between each track block and the traffic control center. The bidirectional flow of information between each vehicle and the traffic control center is not only frequent, but also lengthy and complex, since the progress of each vehicle along the track is totally dependent upon the directives of the traffic control center, with practically no control left to the discretion of its conductor.

The trend towards centralized traffic control operation of railroad networks, based on extensive train location equipment along the track, has been prompted by two factors. On one hand the traditional inability of trains to accurately determine their position between stations prevented their engineers from making, on their own, the acceleration or breaking decisions necessary to reach a predetermined point on time, or to avoid collisions. On the other hand the unavailability of practical and reliable audio radio equipment severely limited communications between train crews and traffic stations. The centralized traffic control has greatly improved the efficiency of networks formerly managed by the traditional time-table method. Under time-table programming, trains were constrained to run within predetermined schedules. These schedules however, had large safety margins to guard against possible interferences with other trains. The network traffic capacity was thus severely limited. Today the time-table method of traffic regulation can still be encountered over some simple and lightly travelled circuits.

The centralized method of traffic management, however, is not without disadvantages. Besides requiring a heavy investment in equipment and maintenance work, the method has other limitations. In spite of the repetitive nature of train schedules, the progress of a particular train over a frequently travelled itinerary is seldom similar from one run to the next. The train movement is subject to random pace variations dictated by the traffic control center in function of the current traffic condition over the network. The resulting braking and acceleration maneuvers increase the fuel consumption. Furthermore, the speed variations coupled with the uncertainty of the exact location of the train within a block create security risks. These risks can only be eliminated by increasing the minimum spacing between trains, thus causing additional delay, waste of energy and lower traffic capacity.

Today's radio communications have been tremendously improved. Electronic miniaturization allows for installation of computer assisted dead-reckoning system on board each train. The task of the traffic control centers could now be safely and very efficiently alleviated by returning to the train crews (or to the train auto-piloting system) some of the track monitoring and decision making operations.

SUMMARY OF THE INVENTION

The method disclosed is a return to a new form of time-table traffic management, free from the former performance limitations, safe, and more efficient, although simpler, than the totally centralized method. The vehicle location and signaling equipment along the track is minimized, and dictated only by safety considerations. The frequency and contents of communications between the traffic control center and the moving vehicles are drastically reduced and can be carried over audio radio channels.

The present invention teaches new method for accurately determining, on board a moving vehicle, its accurate position along an itinerary; and a new procedure for regulating its speed in order to meet its assigned schedule in response to said position determination. The method also teaches the use of stored control instructions (which may have been recorded during a previous run) in order to regulate the pace of the vehicle. Each vehicle can thus assume some of the control and decision-making normally concentrated at the traffic control center. More specifically the invention provides for storing on board each vehicle a set of predetermined time-tables. The time-tables are cross-checked two by two for compatibility and each vehicle is assigned a time-table and a time-lag to be added uniformly to the assigned time-table data. Accurate dead-reckoning equipment on board each vehicle provides a precise measurement of the vehicle compliance with its assigned time-table. The dead-reckoning equipment comprises conventional methods such as wheel revolution counters, and accelerometers. It comprises also the recognition along the itinerary of various planned and unplanned events which have been detected during previous runs and recorded in coordination with their location and timing data. Various cross-checks between sensors, auto calibration and statistical selection of data techniques are used to achieve a highly reliable position determination. The method also teaches the automatic piloting of the vehicle based on acceleration data recorded during experimental runs. These acceleration data are further combined with a signal proportional to the time error computed in function of the assigned time-table and the location displayed on the dead reckoning equipment.

The principal object of this invention is to provide an improved method of time-table traffic management, whereby the coordination between various assigned time-tables can be defined, and the control directives between the control center and the vehicle crews can be exchanged, all in terms of a few simple parameters.

The secondary object of this invention is to provide an accurate method for controlling the pace of a vehicle in exact compliance with its assigned time-table.

IN THE DRAWING

FIG. 5 illustrates the format in which the time-table data is recorded in memory;

FIG. 6 is the block diagram of the automatic pilot system;

FIG. 10 is a block diagram of a second improved version of the probabilistic error correction system;

FIG. 11 is a graph of the probabilistic error correction functions;

DESCRIPTION OF THE PREFERRED EMBODIMENT OF THE INVENTION

Figure 1:
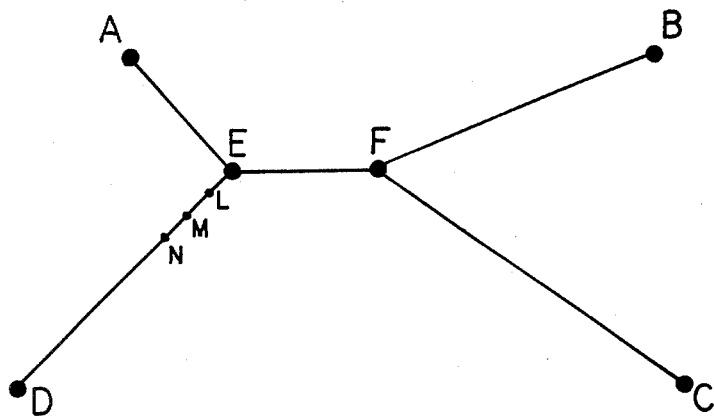
FIG. 1 is the schematic representation of a hypothetical railroad network.

Referring now to FIG. 1 of the drawing, there is shown the diagram of a hypothetical railroad network ABCDEF which comprises four itineraries. Let us assume that itinerary i (AEFB) is travelled from A to B by train Hi; itinerary j (DEFC) is travelled from D to C by train Hj; itinerary k (BFED) is travelled from B to D by train Hk; and itinerary l (CFEA) is travelled from C to A by train Hl. Let us assume also that the distances between locations ABCDE and F are those listed in meters in table G of FIG. 1, that train speeds are constant as listed in meters per second along with the length of each train in meters in table H of FIG. 1. Security regulations further dictate that the spacing between trains cannot at any time be less than 5 minutes. Given the above hypothesis, the regulation of such a network, according to the present invention may be achieved as explained below in order to process the four trains in the most direct method across the network, and with minimum supervision by the traffic regulating center.

Figure 2A:
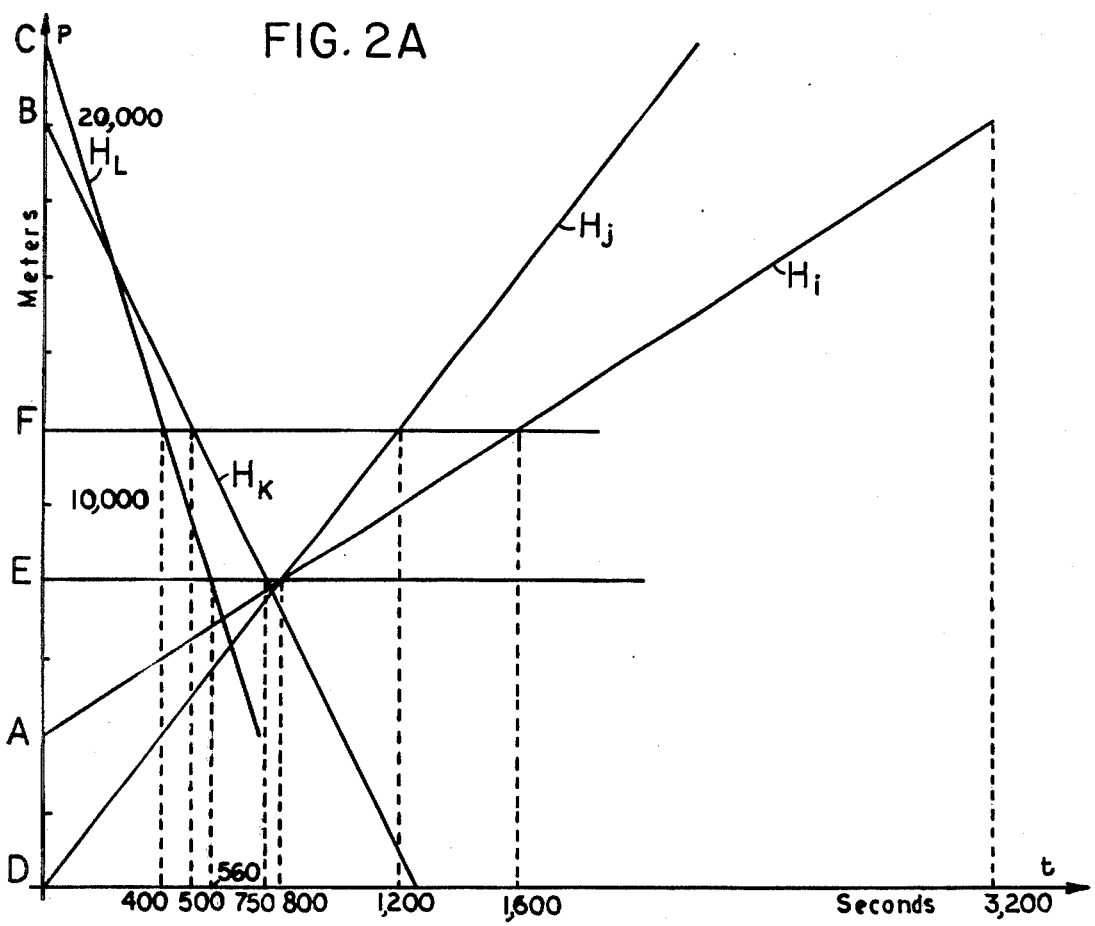
FIGS. 2A through 2D are the timing diagrams of a plurality of railroad time-tables applicable to the network illustrated in FIG. 1.

Each curve of FIG. 2A represents the most direct and fastest time-table for the corresponding train over its assigned itinerary. However, the diagram of FIG. 2A assumes that all four trains start at the same time (t=o) which leads to several conflicts that must be avoided by establishment of priority between trains, adjustment of speed, stop and wait periods or other delaying methods. According to the teachings of this invention, a distinct time-lag TL is added uniformly to each time-table TT so that, when the time-tables are compared two by two, no conflict can be found. This condition may be expressed between, for instance, the time-table of trains Hi and Hj as follows:

$$TL_i \geq TL_j + a_j \cdot l_j + b_{ij}$$

if train Hi is to follow train Hj, and $$TL_j \geq TL_i + a_i \cdot l_i + b_{ji}$$

if train Hj is to follow train Hi; wherein TLi and TLj are the time lags added to the time-tables of train Hi and Hj respectively, li and lj are the lengths of trains Hi and Hj respectively, and ai, aj, lij and bji are constant factors established in function of the itineraries and trains characteristics.

In our hypothesis ai, aj, ak and al are equal to the inverses of the speeds of train Hi, Hj, Hk and Hl respectively. The constant bij may be determined according to the formula:

$$b_{ij} = Tc_j - Tc_i + SF$$

Wherein Tcj is the time set in the basic time-table of the first train for passing at the "critical point" and Tci the time in the time-table of the second train corresponding to the same "critical point". For trains travelling in the same direction over a common path such as Hi and Hj from point E to point F, the critical point is the point of entry E if the first train is faster, and the point of exit F if the following train is faster. For trains travelling in opposite directions over a common path such as Hi and Hk, and trains Hj and Hl, the critical point is where the first train leaves the common section of tracks and where the second enters that common section.

Figure 2B:
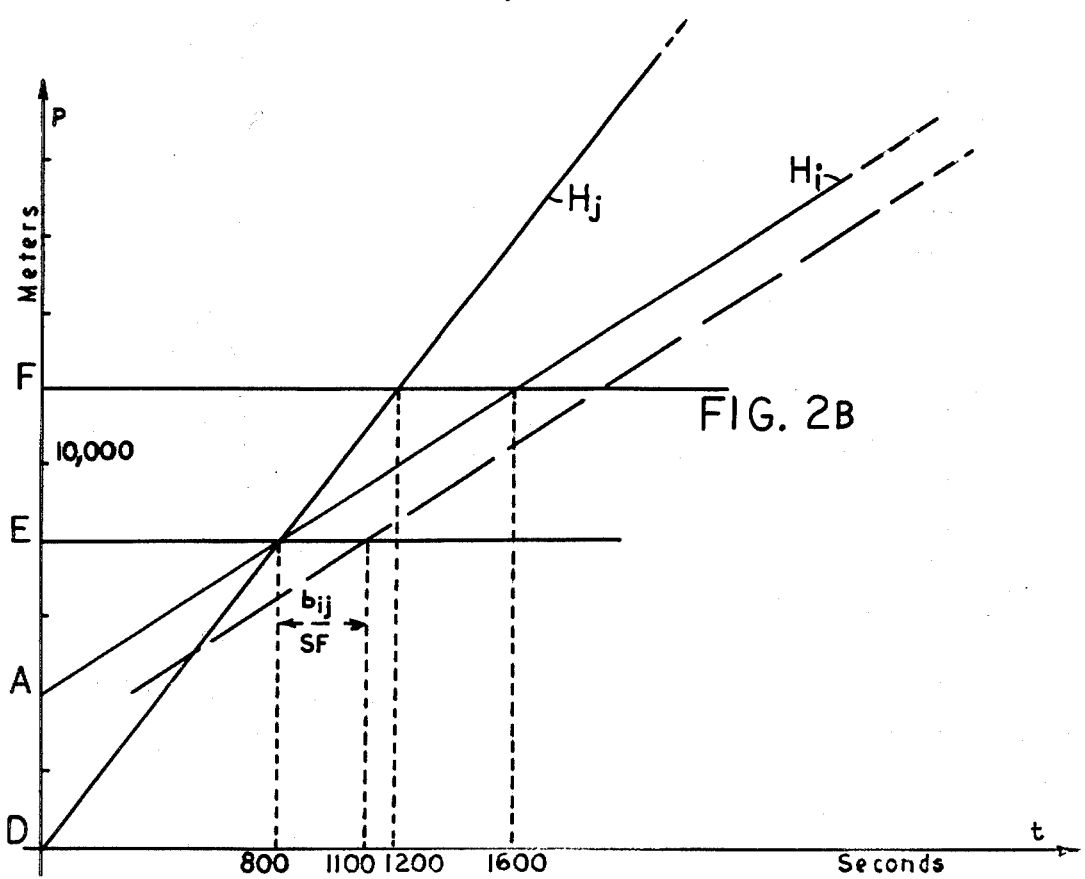
Figure 2C:
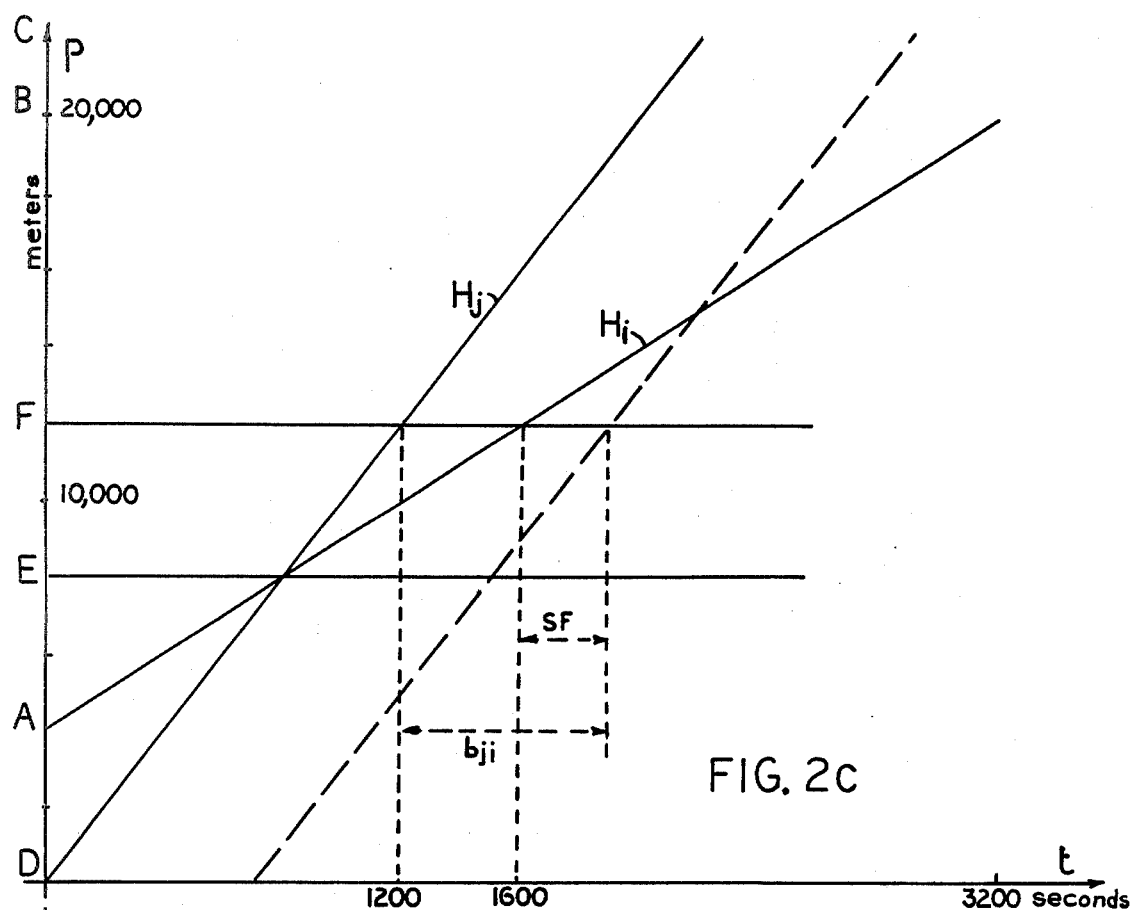

FIG. 2B shows the basic time-tables of trains Hi and Hj and how bij is determined in order to delay Hi so that Hi will travel the common section safely after train Hj. Hj being faster than Hi, the point E is the critical point. According to those time-tables, Tci=800s, Tcj=800s, hence bij=SF=300s FIG. 2C shows how bji is determined in order to delay train Hj so that it travels safely after Hi on the common path. The critical point is now F, Tcj=1200, Tci=1600 hence bji=1600−1200+300=700s.

Figure 2D:
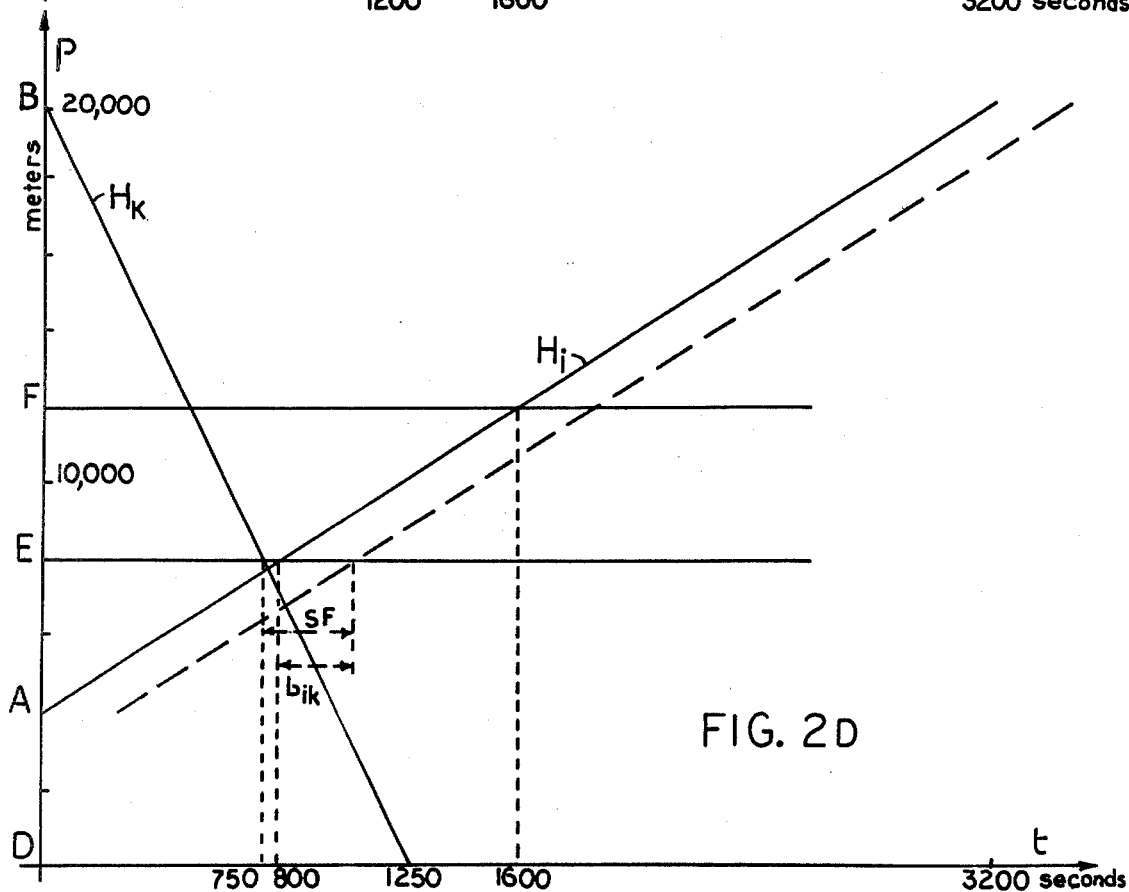

FIG. 2D illustrates how bik is determined so that Hi safely enters the common path after Hk has left it. In this case, E is the critical point. Hence, bik=250, and so forth. Accordingly, the following values are obtained: ai=0.2, aj=0.1, ak=0.0625 al=0.04

|         | bij=300 | bik=250 | bil=60  |
|---------|---------|---------|---------|
| bji=700 |         | bjk=250 | bjl=60  |
| bki=1400| bkj=1000|         | bkl=200 |
| bli=1500| blj=1100| blk=490 |         |

A variety of 24 combinations of orders of priority is offered with 4 trains. Let us assume that the selected order is Hl, Hj, Hk, Hj. The time-lags to be assigned to the time-tables must meet the following conditions, starting with TLl=0:

$$TL_j \geq a_l \cdot l_l + b_{jl}; \quad TL_i \geq a_l \cdot l_l + b_{jl}$$
$$TL_b \geq a_l \cdot l_l + b_{kl}; \quad TL_i \geq TL_j + j \cdot l_j + b_{ij}$$
$$TL_k \geq TL_j + a_j \cdot l_j + b_{kj}; \quad TL_i \geq TL_K + a_k \cdot l_k + b_{ik}$$

The above conditions are satisfied by the following time lag values, in seconds TLj=68 and TLk=1218 and TLi=1531. Adding these time-lags to the respective time-table eliminates all the previous conflicts.

Figure 3:
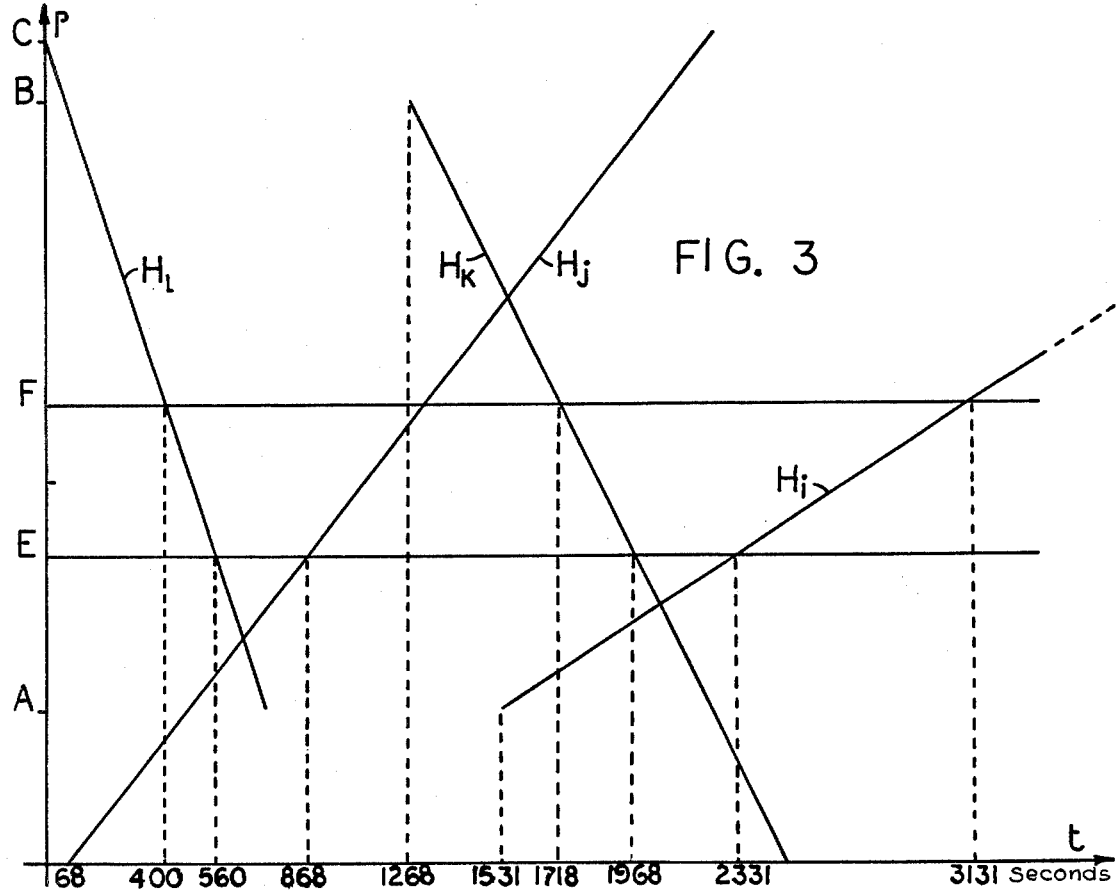
FIG. 3 is a timing diagram of said time-table after they have been coordinated.

FIG. 3 illustrates the resulting timing diagram for the entire network operation. New time-tables with modified itineraries, new trains or different train speeds could be introduced into the above scheme. Such additional time-tables would have to be checked two by two against each other and against the previously established ones according to the procedure just described. The procedure would yield a new set of time-lags to be communicated to the respective trains in order to establish a new overall workable schedule for the network. Conversely, a vehicle crew may have to ask by radio communication, for agreement on an increased time-lag if for any reason it has been delayed, or they may report they had to switch to a lower grade time-table (slower time-table).

The present method of traffic management may be readily adapted to networks already equipped with standard block signaling systems for avoiding train collisions. Rather than using a security factor SF in the form of a time constant as previously described, the values of bij are established in function of the restrictive signaling generated by the immediately preceeding train.

Figure 15:
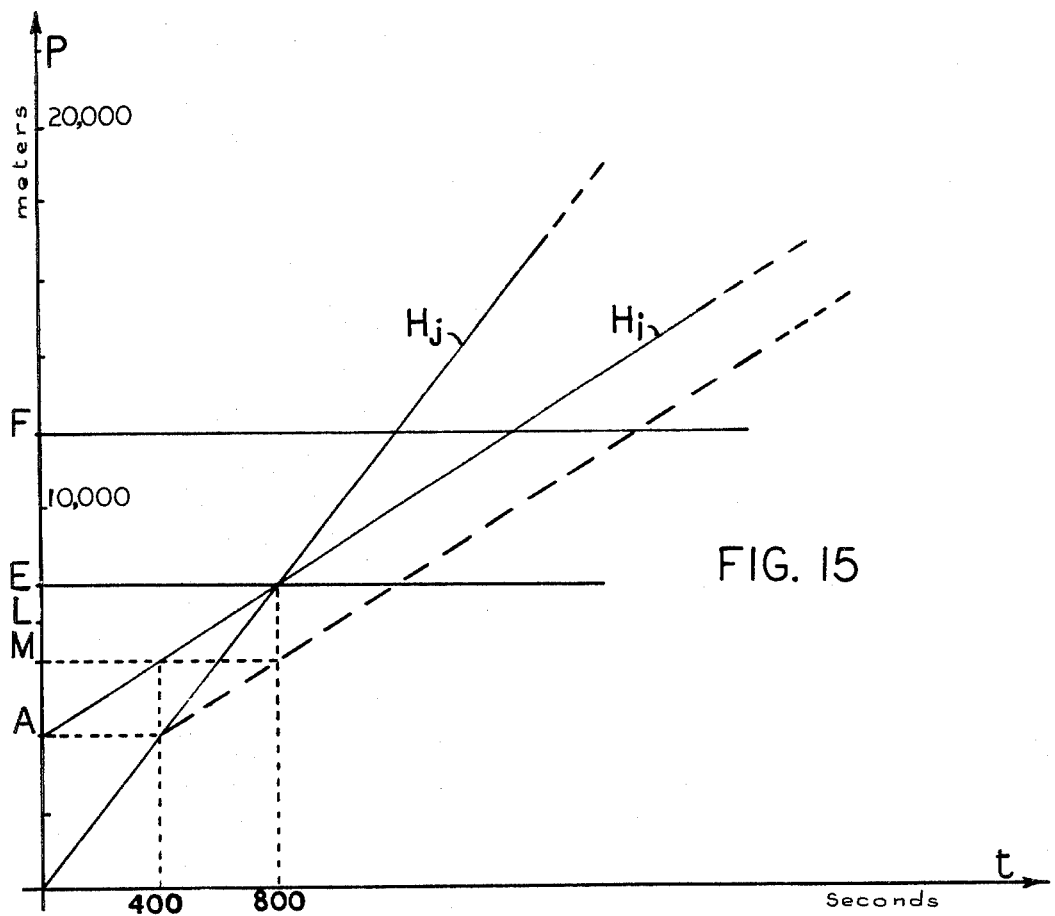
FIG. 15 is the timing diagram of two vehicle time-tables over a network having a security block signaling system.

The following example illustrates a method for determining bij on the previously described network subdivided in 1000 meters blocks, for trains Hi and Hj sharing a common path EF. Referring now to FIG. 15, given the slow speed of Hi, the distant signal at point M being the first restrictive signal to affect Hi if Hj has not cleared point E, bij is computed as follows: $bij = Tcj - Tci$ where Tcj is the time at which Hj clears point E and Tci is the time when Hi clears point M. For the sake of simplicity, the above example assumes that both trains have constant speeds. It should be noted however, that the same method applies to variable speed time-tables, with or without safety signaling. Interference limit conditions for a vehicle Hi following a vehicle Hj without having to slip off its assigned time-table may always be expressed in condensed form through two constant such as aj and bij.

The invention contemplates that all the time-tables applicable to a particular vehicle are stored in advance on board said vehicle. It follows that the overall regulation of the traffic over the network, according to the method just described, can be achieved by communicating from the traffic control center to each vehicle two simple instructions; to wit: the identification number of its assigned time-table and its assigned time-lag. This type of simple communication can easily be carried over ordinary radio channels. This method for regulating vehicular traffic over a network of interferring itineraries assumes that each vehicle has the on board capability of accurately complying with the assigned time-table and time-lag, or at least to be aware of any discrepancy as soon as it appears.

Figure 4:
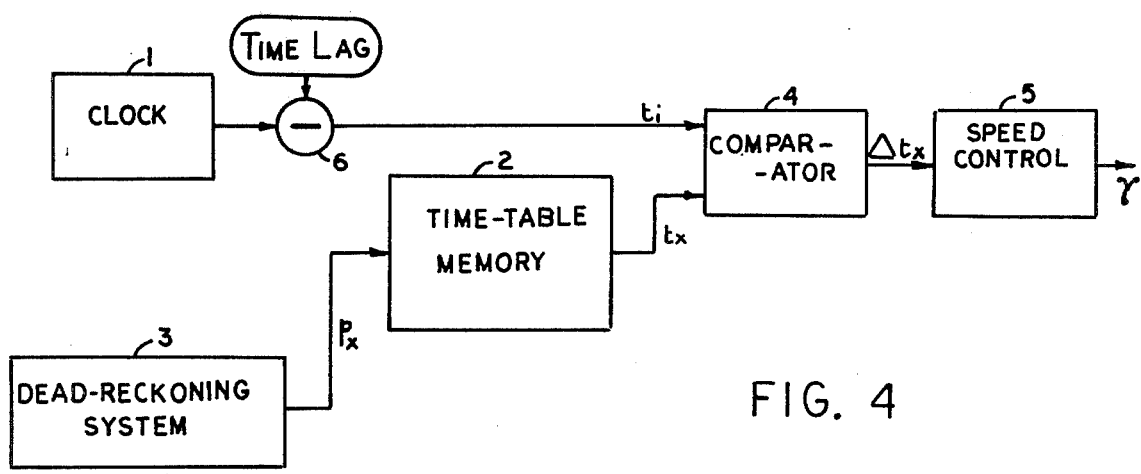
FIG. 4 is the general block diagram of the dead-reckoning system.

FIG. 4 gives the general block diagram of the process carried out on board each vehicle. Block 1 represents a time of day clock synchronized with the traffic command center clock. Block 2 illustrates a memory in which the time-tables are stored. Block 3 indicates the dead-reckoning process which determines accurately the position of the vehicle along its assigned intinerary. The position coordinates px indicated by the dead-reckoning process 3 is used to address the time-table memory 2. The time tx at which the vehicle should pass the position defined by px according to the assigned time-table is read out of the memory and compared to the clock time ti modified by the assigned time-lag TL, in the comparator 4. The resulting time error $\Delta tx$ is used in the vehicular control process 5 to generate a acceleration or deceleration command $\gamma$ designed to reduce the time error $\Delta tx$ to zero. In order to achieve a smooth and accurate operation of the system it may be necessary to instantaneously detect and measure the time error $\Delta tx$. Quasi-continuous time-tables are provided to that effect.

Figure 12:
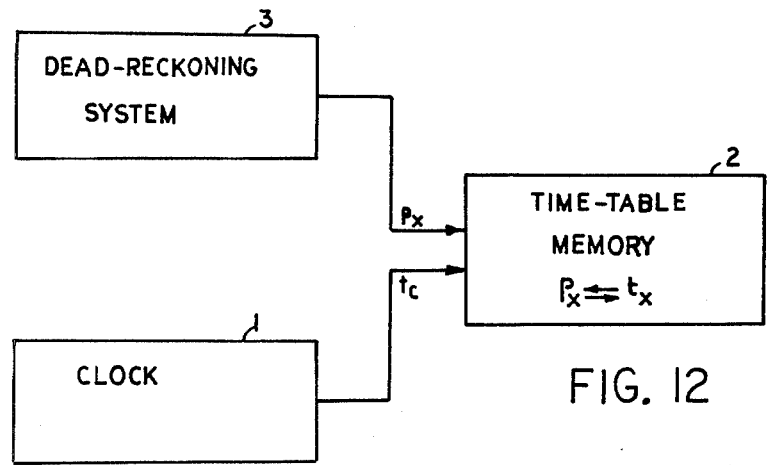
FIG. 12 is a block diagram of the time-table memory loading process.

In the time-table memory 2, the vehicular positions $P_1, P_2, P_3$ etc ... are recorded in relation to clock time t1, t2, t3 etc. as shown in FIG. 5. These memory data may be generated, a priori, in the laboratory. Preferably they should be established by entering the values generated by the clock 1 and the dead-reckoning process 3 during an experimental run of the vehicle. This latter method guarantees that the time-table can actually be duplicated by this particular vehicle during future runs. FIG. 12 illustrates the process used during such an experimental run.

The control process 5 may be accomplished by the conductor of the vehicle himself in response to a display of the time error $\Delta tx$. Preferably it is done automatically according to the auto-piloting method illustrated in FIG. 6. It should be noted that the time indication tc issued from the clock 1 must be reduced in 6 by the assigned time-lag TL entered by the operator.

Figure 13:
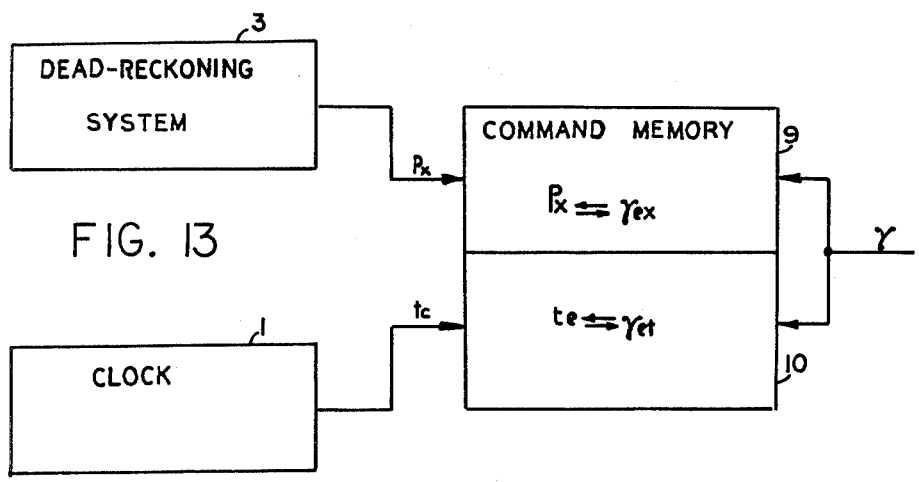
FIG. 13 is a block diagram of the command memory loading process.

In a second memory 9, are stored the instantaneous acceleration or deceleration commands to be applied to the vehicle in relation to the vehicle position px. These commands are also cross-related in the memory 10 to the times tx corresponding to the position px according to the assigned time-table. These acceleration or deceleration commands can be computed a priori and entered in the laboratory. Preferably they are recorded during an experimental run of the vehicle over the corresponding itinerary, according to the procedure illustrated in FIG. 13. During subsequent runs command datum $\gamma ex$ is extracted from the memory 9 in function of the position coordinate px issued by the dead-reckoning process 3, to which a correction factor corresponding to the product of the speed vx by the response time, TR of the vehicle to acceleration or deceleration commands is added at 8. Command datum $\gamma et$ is extracted from the memory 10 in function of the time te derived from the clock after adding the response time TR to the time Ti, in 7, so that $te = tc + TR - TL$. A selector circuit 13 allows $\gamma ex$ to reach adder circuit 14 only when $\gamma ex$ value is negative or corresponding to a deceleration command. The command $\gamma et$ is fed to adder 14 only when it is positive and corresponding to an acceleration command. The command data $\gamma ex$ and $\gamma et$ should theoretically be sufficient to allow the vehicle to faithfully duplicate the experimental or theoretical run the characteristics of which have been stored in the memories 2 and 9. However, the inherent inaccuracy of the various organs of the vehicles would tend to cause a drift away from the time-table schedule. An additional acceleration or deceleration component $\gamma x$ is thus generated in 12 in function of the time error $\Delta tx$ according to the formula:

$$\gamma = A\Delta tx + B(d\Delta tx/dt)$$

wherein A and B are constant factors determined in accordance with the characteristics of the vehicle the itinerary and other contingencies. The acceleration or deceleration $\gamma x$ is then added to $\gamma ex$ or $\gamma et$ in adder 14. The resulting value $\gamma$ is used to control the vehicle traction and braking machanism 27. The value $\gamma x$ thus acts as a corrective feedback to the command data $\gamma ex$ and $\gamma et$. The process and equipment just described and illustrated in FIG. 6 constitutes a form of auto-pilot with two components which can achieve great accuracy and safety of operation.

Figure 7:
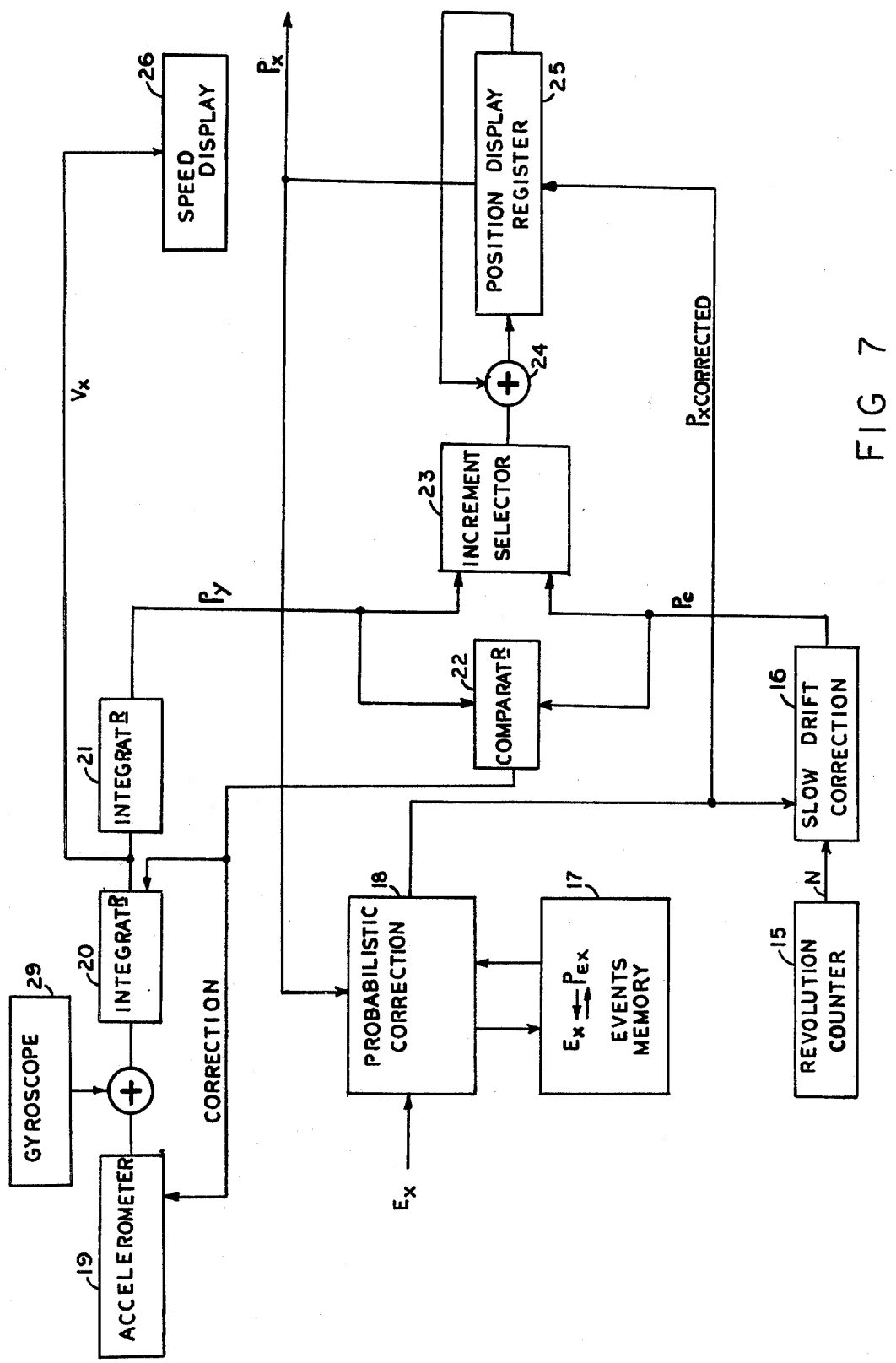
FIG. 7 is a detailed block diagram of the dead-reckoning system.

The dead-reckoning process 3 is illustrated more explicitly in block diagram form by FIG. 7 of the drawing. The basic principle for achieving great accuracy in dead-reckoning, in accordance with the present invention, is to use multiple measurement techniques which are then cross-checked and statistically interpreted.

Various types of distance measurement techniques and devices may be advantageously used within the scope of this invention. For the sake of explanation, an acceleration technique and a wheel revolution counter technique will be specifically discussed. The first measurement chain comprises a wheel revolution counter 15 associated with a long term drift correction circuit 16 to indicate the estimated distance travelled pc.

The second measurement chain comprises an accelerometer 19 which is located on the vehicle structure so as to give an indication of the longitudinal acceleration 20 applied to it. In a train locomotive this accelerometer should be located near the center of the moving body in order to reduce the effect of the lateral acceleration experienced during the negotiating of curves. In order to compensate for slopes and suspension deflections, a tilting correction generated by a gyroscope 29 is added to the accelerometer 19 output. The acceleration data are fed to a first integrator circuit 20 at the output of which the speed vx of the vehicle is read and displayed at 26. A second integrator circuit 21 is used to obtain the estimated distance travelled py. An increment selector 23 periodically selects the distance increment indicated during the current measurement period from either pc or py. This incremented period may conveniently be in the order of one second. The selection function may be the sum of $Q_{Pc}$ and $(1-Q)_{Py}$ where Q is the weight factor attributed to the revolution counter data. The selected increment is then added in 24 to the content px of a position display register 25 in order to generate the current position coordinates which is immediately entered into the display register 25 in place of the previous reading.

It should be noted that the wheel-revolution counter and the accelerometer constitute two measurement techniques which appropriately complement one another. The accelerometer usually gives a reliable measure but its twice integrated output signal is subject to drifting. It is known that during periods of high acceleration or on uphill ramps, the traction wheels of a vehicle are subject to spinning. During the deceleration process the wheels are subject to skidding. The revolution-counter is thus a poor gauge of the distance travelled during these periods; but can safely be relied upon during long periods of constant speed or of low power application, to provide precise measurement on the basis of which the accelerometer can be recalibrated. The increment selector 23 operates in function of the raw, absolute value of acceleration and gives more weight to distance increments from the wheel revolution-counter in inverse proportion to the amplitude of the accelerometer output. A comparator circuit 22 is further added in order to generate a correction factor for the accelerometer and the speed indicator 26 in function of the error detected between pc and py during periods when the wheel revolution-counter can be expected to yield very reliable data.

The combination of the two complementary measurement techniques can provide reliable positive data over a short run. For long distance, the slow drift accumulated by each method due to the systems components tolerances and inherent inaccuracies could result in substantial error, after several kilometers. The probabilistic correction circuit 18 in association with memory 17 is used to periodically correct the positive display register 25, as described below.

Figure 8:
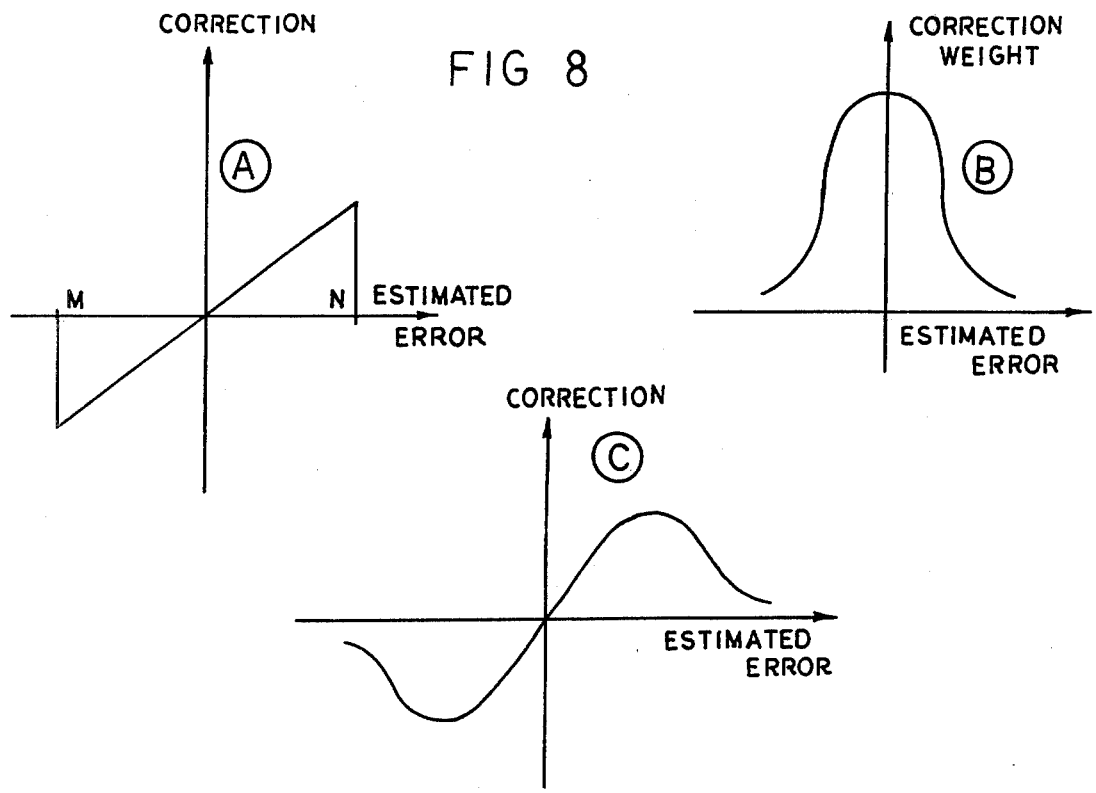
FIG. 8 is a graph of the error correction functions.

A well known method for automatically correcting dead-reckoning systems consists in installing along the track a series of check points evidenced by markers or contact ramps which can be sensed by vehicles passing over it. Since the location of these check points is accurately known their detection can trigger automatic correction of the position display data. In order to avoid the untimely correction of the position data triggered by spurious signals, check point detection equipment is, in its normal state, inhibited and allowed to operate only when the vehicle is approaching the area where it is expected to pass the check point, then shut-off again. The adjustment of the width of the window during which the check point can reasonably be encountered is often a compromise between two risks. First the risks that the check point will be missed altogether if the window is too narrow. Second, the risk that a spurious signal will be detected and mistaken for the check point if the window is too wide. The amount of applied correction in function of the detected error is shown by the function A of FIG. 8 wherein the distance between point M and N is proportional to the width of the window.

Figure 9:
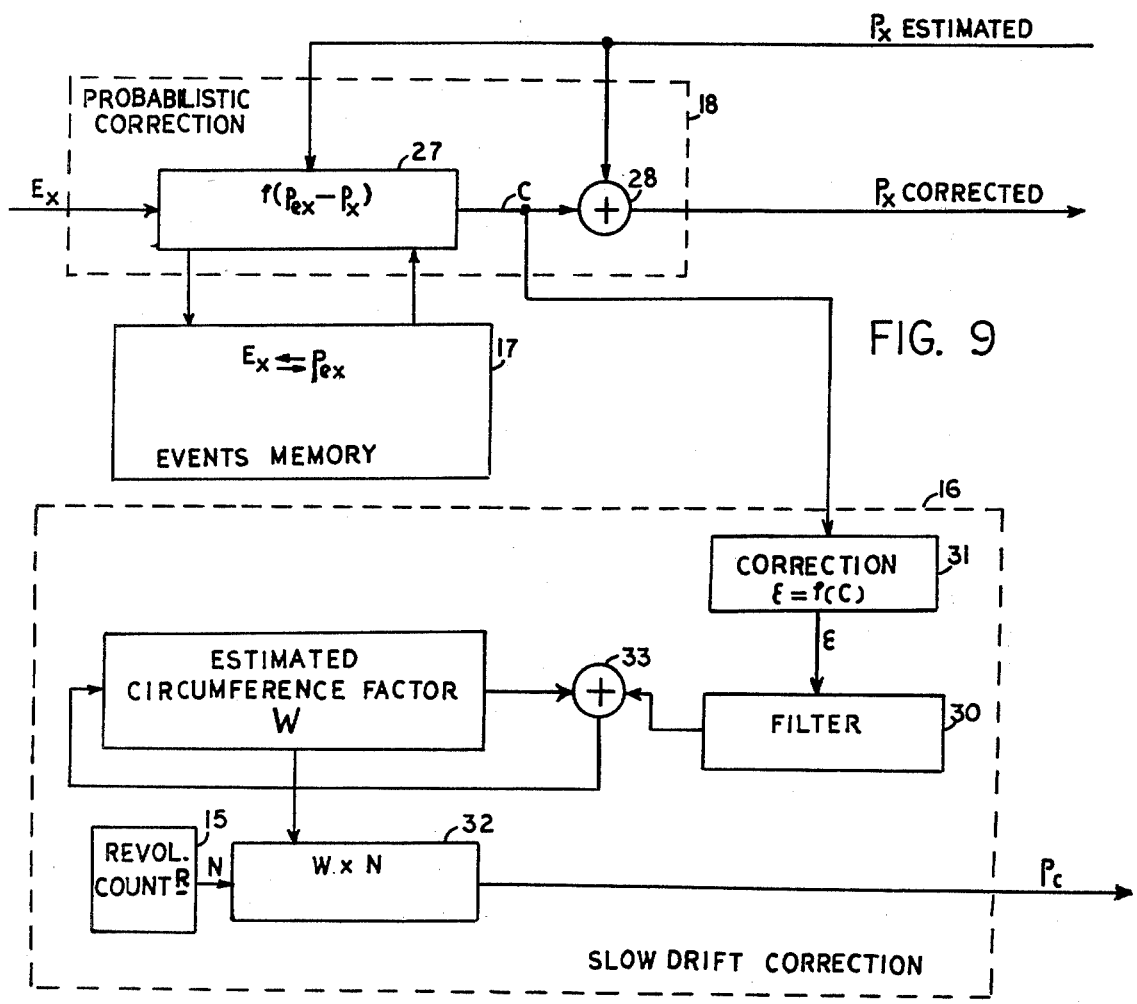
FIG. 9 is a block diagram of a first version of the probabilistic error correction system.

The present invention teaches a method attributing a corrective weight to the detection of a check point in proportion to the probability that it is not a spurious signal. That probability is assumed to be in function of the closeness of the detected checkpoint position to its expected location. For instance, the correction could be done in proportion to the curve B of FIG. 8 which shows the correction weight to be in function of the difference between the known location of the expected check point and the current estimated location i.e., the estimated errors. This technique, which avoids the discontinuity of the correction function at points M and N, corresponds to opening a window with variable limits as evidenced by curve C of FIG. 8 which show the correction in function of the time error. FIG. 9 is a block diagram of the probabilistic correction process illustrated by curve C of FIG. 8.

A memory 17, holds in storage the known measured location pex of each check point Ex. Upon detection of a check point Ex, its closest known location pex is extracted from the memory 17 and compared to the location px currently stored in the display register 25. A correction C is computed in function of the difference in 27 and added to px at 28. The resulting corrected px data is then entered into the display register.

FIG. 9 also illustrates the block diagram of the process followed in correcting the slow drift error caused by variations in the wheel circumference due to wear and temperature variations.

The wheel circumference factor W (multiplied in 32 by the number of revolutions N indicated by the counter 15) is quasicontinually adjusted by a minute correction factor $\epsilon$ added to it at 33. The correction factor $\epsilon$ is a function of the correction C applied to the display register 25 upon detection of a check point. This correction is computed in the correction circuit 31. A low-pass, integrating type filter 30 may be advantageously installed between the circuit 31 and the adder circuit 33 in order to stabilize the corrective system loop. The exact location coordinates pex of each check point Ex can be determined by survey and written into the memory 17 in the laboratory. These coordinates can also be recorded during an experimental run according to the following procedure.

Figure 14:
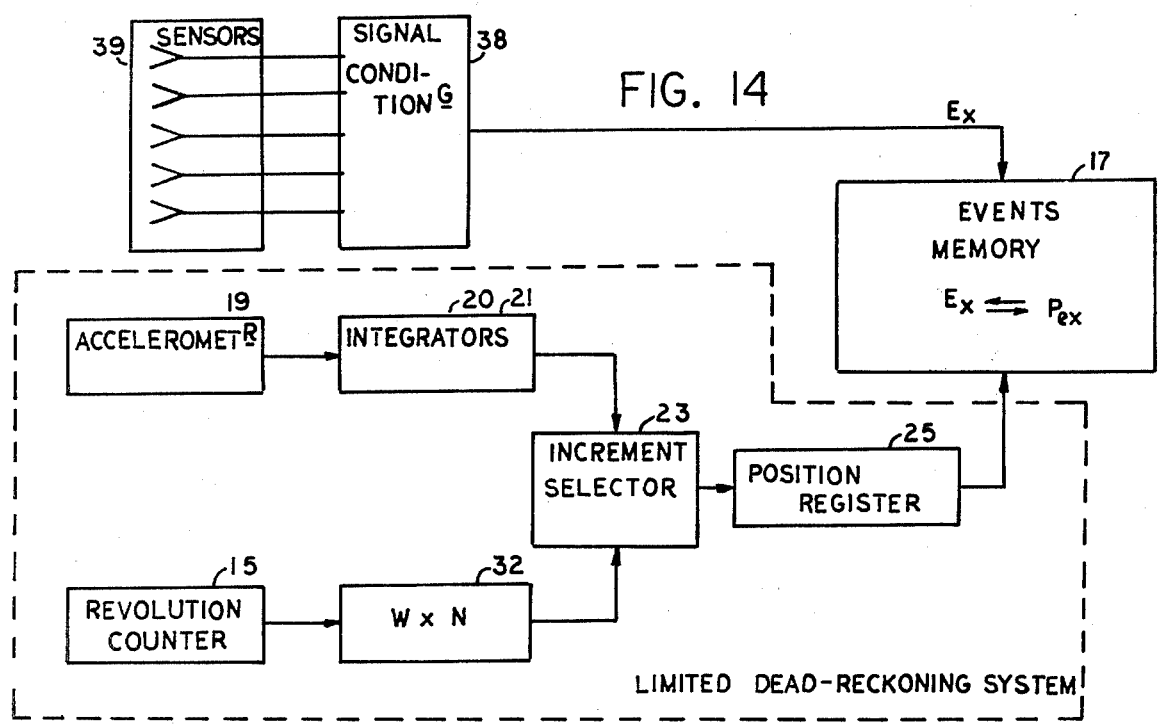
FIG. 14 is a block diagram of the events memory loading process.

The locations of the check points are measured and recorded using the dead-reckoning apparatus described above, limited to the two complementary measurement techniques as shown in FIG. 14. The recorded coordinates are then extracted and corrected in function of the measurements obtained through said limited dead-reckoning apparatus between two well known reference locations. The corrected values P1, P2, P3 etc... of the check points can be derived from the recorded coordinates p1, p2, p3 etc... through the following equation:

$$P_x = \frac{B_1 - B_2}{b_1 - b_2} P_x - \frac{b_2 B_1 - b_1 B_2}{b_1 - b_2}$$

wherein B1 and B2 are the true known coordinates of the reference locations and b1 and b2 their measured coordinates.

The type of check points used in the first described correction process requires substantial investment for installation and maintenance. According to the teachings of this invention most of these planned events constituted by the encounter along the itinerary of premeasured check points can be advantageously replaced by the detection of unplanned events which have not necessarily been installed for that purpose. These unplanned events can be, for instance, a lateral deflection of the vehicle at a curve, the variations in vertical acceleration due to obliguity of the track, the variations in the amount of light reflected by the tracks, the variation of sound levels when the vehicle crosses a bridge or passes under a tunnel and a multitude of other recurring immutable physical phenomena detectable along a particular itinerary. Referring now to FIGS. 7, 10 and 14, the method can be explained as follows:

The various physical phenomena are first recorded in the course of an experimental data gathering run over the itinerary. The vehicle for that purpose is equipped with a plurality of sensors and transducers 39. The various output signals are processed through signal conditioning equipment 38 then digitized into binary coded words which can conveniently be stored in a memory 17 in correlation with the location coordinates pex measured by the dead-reckoning system at time of their occurence. Each phenomena variation is thus translated into a event Ex which can be extracted from the memory 17 in function of its location coordinates pex. These coordinates can be corrected according to the procedure previously outlined.

During subsequent runs over the same itinerary the estimated location px derived from the location display register 25 is sent to a probability limit circuit 34. This probability limit circuit define the two limits of an interval inside which the vehicle is supposed to be (with a probability of, for example ninety-nine per cent). These limits are computed in function of px and statistical factors such as a standard deviation and a multiplier n based on the estimated accuracy of the distance measurement equipment. The multiplier n, for instance may be proportional to the distance travelled since the last correction was made. The statistical limit circuit 34 generates two limits pxm and pxr which are applied as addresses to the memory 17. The coded events Exm through Exr corresponding to the addresses included in the margin defined by Pxm and Pxr are extracted and compared in 35 to the event currently issuing from the phenomena sensing equipment 38, 39.

When identity of signals is found between the information extracted from the memory 17 and the information issued by the sensing equipment 38-39, the corresponding location coordinate Pxn which lies between Pxm and Pxr is transmitted to the correction factor generator circuit 36. In the correction factor generator circuit 36, the location coordinate Pxn is compared to the estimated location px and a correction value C is generated according to a function similar to that illustrated by curve C of FIG. 8. The correction value is then added at 37 to the estimated position coordinate px. The resulting corrected coordinates are then entered into the display register 25. The correction value C is also used to reset the variable statistical factor used in the statistical limit circuit 34.

In cases where multiple informations within the Pxn Pxr margin are found to correspond to the incoming event Ex the correction value C is appropriately decreased in function of the uncertainty thus created.

Although reference has been made throughout this specification to railroad installations, the method of traffic regulation disclosed herein may be applied to other forms of vehicular movements. These methods may be advantageously used in the regulation of maritime traffic in and out or within a harbor, as well as over a network of canals. Regulation of airborne traffic would also benefit from the application of some of the techniques explained above.

The methods described above may be implemented through the installation on board such vehicles of electronic data processing equipment of both analog and digital types. The function sought to be performed are within the current state of the art and within the knowledge and capabilities of persons skilled in the electrical and mechanical arts.

Although I have described specific means for implementing the methods disclosed herein, other means may be used for that purpose within the scope of my invention as defined by the appended claims.

I claim:

1. A method for regulating the flow of vehicular traffic over a network of interconnected itineraries travelled by a plurality of vehicles which comprises:
    (a) defining at least one time-table for each vehicle over each itinerary to be travelled by said vehicle;
    (b) storing said time-table on board said vehicles;
    (c) assigning to each vehicle a time-table and a time-lag in coordination with the time-tables and time-lags assigned to other vehicles scheduled to travel over said network; on board each vehicle Hx,
    (d) continuously reckoning the location coordinates px of said vehicle Hx;
    (e) controlling the movement of vehicle Hx along said itinerary in function of the time of day and the coordinates px in order to meet its assigned time-table as modified by its assigned time-lag.

2. The method claimed in 1 wherein step 1b comprises:
    (a) storing on board said vehicle an assigned time-table comprising location coordinates defining a plurality of sequential points along said itinerary in correlation which the time required for said vehicle to reach said points; and Step (1d) comprises:
(b) measuring the distance travelled by said vehicle through a plurality of independent means;
(c) accumulating said travelled distances in a register by periodical increments selected from said means whereby a particular means is selected as a source of periodical increment only during such phase of the vehicle movement when said means is expected to be the most accurate.

3. The method claimed in 2 which further comprises:
(a) storing on board said vehicle the premeasured location coordinates of a plurality of events which can be detected by said vehicle along its itinerary;
(b) detecting the encounter of said events along the itinerary and upon detection of each of said events, update the contents of said register by an amount derived from a continuous non-linear function of the difference between the current distance accumulated in said register and the stored coordinates of the events being detected;

4. The method claimed in 3 wherein said events comprise:
means specifically installed along said itinerary as indicators of position; and recurring and immutable physical phenomena detectable along the itinerary, wherein the locations of occurrence coordinates of said events have been recorded during an experimental run over said itinerary.

5. The method claimed in 4 which further comprises:
(a) recording in a memory during said experimental run, an identification code for each said event in coordination with its location of occurrence coordinates;
(b) reading at least one of said events identification code during subsequent scheduled runs from said memory according to an address margin determined in function of the estimated location coordinates held in said register combined with statistical factors which are modified in function of the current estimated accuracy of the coordinates held in said register;
(c) comparing the identification code of the event being detected with the identification code being read out from the memory;
(d) upon detecting similarity between said identification codes, generating a correction factor to be applied to the contents of said register where said correction factor is a continuous non-linear function of the difference between the coordinates stored in the register and the prerecorded location coordinates of the detected event.

6. The method claimed in 1 wherein step 1e comprises:
(a) computing the time error between the time derived from a clock and the time at which the vehicle should pass the location defined in step 1d.

7. The method claimed in 6 wherein step 1e further comprises:
(a) storing periodically on board said vehicle the instantaneous acceleration or deceleration commands applied to said vehicle during an experimental run over said itinerary in correlation with its location and in correlation with the time at which said commands were recorded; and during subsequent scheduled runs;
(b) extracting from storage said commands in function of the location coordinates derived from said register, and said commands in function of the time derived from a clock;
(c) computing an acceleration or deceleration command in function of said time error;
(d) applying a combination of said various commands to the vehicle.

8. The method claimed in claim 2 wherein step 2b comprises:
measuring said distance by means of at least one accelerometer, the output of which is twice integrated, and by means of at least one wheel revolutions counter, wherein the accelerometer generated data are given more weight during periods of acceleration and deceleration and the revolutions counter data are given more weight during periods of constant speed or minor acceleration and deceleration.

9. The method claimed in 8 which further comprises:
modifying the wheel circumference factor used to calculate the distance travelled from the wheel revolution counters data, by a correction factor adjusted periodically in function of the error between said data and measurement derived from at least one other means.

10. The method claimed in claim 1 wherein step 1c comprises:
(a) examining each combination of two said time-tables, TTi and TTj for possible interference and defining for each said combination up to four parameters, ai, aj, bij and bji, whereby
when a first vehicle Hi, which has been assigned a time-table TTi and a time-lag TLi, is to use the same path as, and follow a second vehicle Hj, which has been assigned a time-table TTj and a time-lag TLj, $TLi \geq TLj + aj \cdot lj + bij$, wherein lj is the length of vehicle Hj, and
when vehicle Hi is to precede vehicle Hj over said path, $TLj \geq TLi + ai \cdot li + bji$, wherein li is the length of vehicle Hi;
(b) negotiating between the vehicles crews and a traffic control center, by radio communication, changes of time-tables or time-lags.

* * * * *